(12) United States Patent
Liu

(10) Patent No.: US 7,571,052 B2
(45) Date of Patent: Aug. 4, 2009

(54) GOLFING AID DEVICE CAPABLE OF DISPLAYING AND SETTING POINTS-OF-INTEREST

(76) Inventor: Chun-Sam Liu, 2F., No.5-1, Lane 57, Kwang-Fu S. Rd., Taipei 105 (TW)

( * ) Notice: Subject to any disclaimer, the term of this patent is extended or adjusted under 35 U.S.C. 154(b) by 550 days.

(21) Appl. No.: 11/362,079

(22) Filed: Feb. 27, 2006

(65) Prior Publication Data
US 2006/0212221 A1    Sep. 21, 2006

(30) Foreign Application Priority Data
Mar. 16, 2005    (TW) ................ 94108070 A

(51) Int. Cl.
*A63B 57/00* (2006.01)
*G01C 21/00* (2006.01)

(52) U.S. Cl. ............. 701/213; 473/409; 473/407; 342/357.13; 701/208

(58) Field of Classification Search .......... 701/208, 701/209, 213; 473/409; 342/357.13
See application file for complete search history.

(56) References Cited

U.S. PATENT DOCUMENTS

| | | | |
|---|---|---|---|
| 5,364,093 A * | 11/1994 | Huston et al. ............ 473/407 |
| 5,524,081 A * | 6/1996 | Paul .................... 701/300 |
| 5,528,248 A * | 6/1996 | Steiner et al. ......... 342/357.06 |
| 5,873,797 A * | 2/1999 | Garn .................... 473/407 |
| 5,884,219 A * | 3/1999 | Curtwright et al. .......... 701/213 |
| 6,236,360 B1 * | 5/2001 | Rudow et al. ............ 342/357.13 |
| 6,263,279 B1 * | 7/2001 | Bianco et al. .............. 701/213 |
| 6,278,402 B1 * | 8/2001 | Pippin .................. 342/357.08 |
| 6,324,476 B1 * | 11/2001 | Trovato ................... 701/301 |
| 6,427,115 B1 * | 7/2002 | Sekiyama ................. 701/208 |
| 6,456,938 B1 * | 9/2002 | Barnard .................. 701/213 |
| 7,118,498 B2 * | 10/2006 | Meadows et al. ........... 473/407 |
| 7,123,189 B2 * | 10/2006 | Lalik et al. ............. 342/357.13 |
| 2002/0082122 A1 * | 6/2002 | Pippin et al. .............. 473/407 |
| 2002/0082775 A1 * | 6/2002 | Meadows et al. ........... 701/214 |
| 2003/0149496 A1 * | 8/2003 | Johnson .................. 700/91 |
| 2005/0131637 A1 * | 6/2005 | Chu et al. ................ 701/208 |
| 2005/0253752 A1 * | 11/2005 | Lalik et al. ............. 342/357.13 |

* cited by examiner

*Primary Examiner*—Thomas G Black
*Assistant Examiner*—Lin B Olsen
(74) *Attorney, Agent, or Firm*—Bacon & Thomas, PLLC

(57) ABSTRACT

A golfing aid device capable of displaying and setting points-of-interest includes a processor, a screen, an input mechanism, a memory, a GPS module and a software program stored in the memory. The software program includes a points-of-interest setting interface and a points-of-interest displaying interface. A characteristic of the points-of-interest displaying interface are left-side, central and right-side displaying areas. When a point-of-interest with a left-side/right-side attribute is displayed, it is displayed in the left-side/right-side displaying area. On the other hand, a point-of-interest without a left-side/right-side attribute is displayed in the central displaying area. Therefore, the user can easily read the information displayed on the points-of-interest displaying interface.

17 Claims, 6 Drawing Sheets

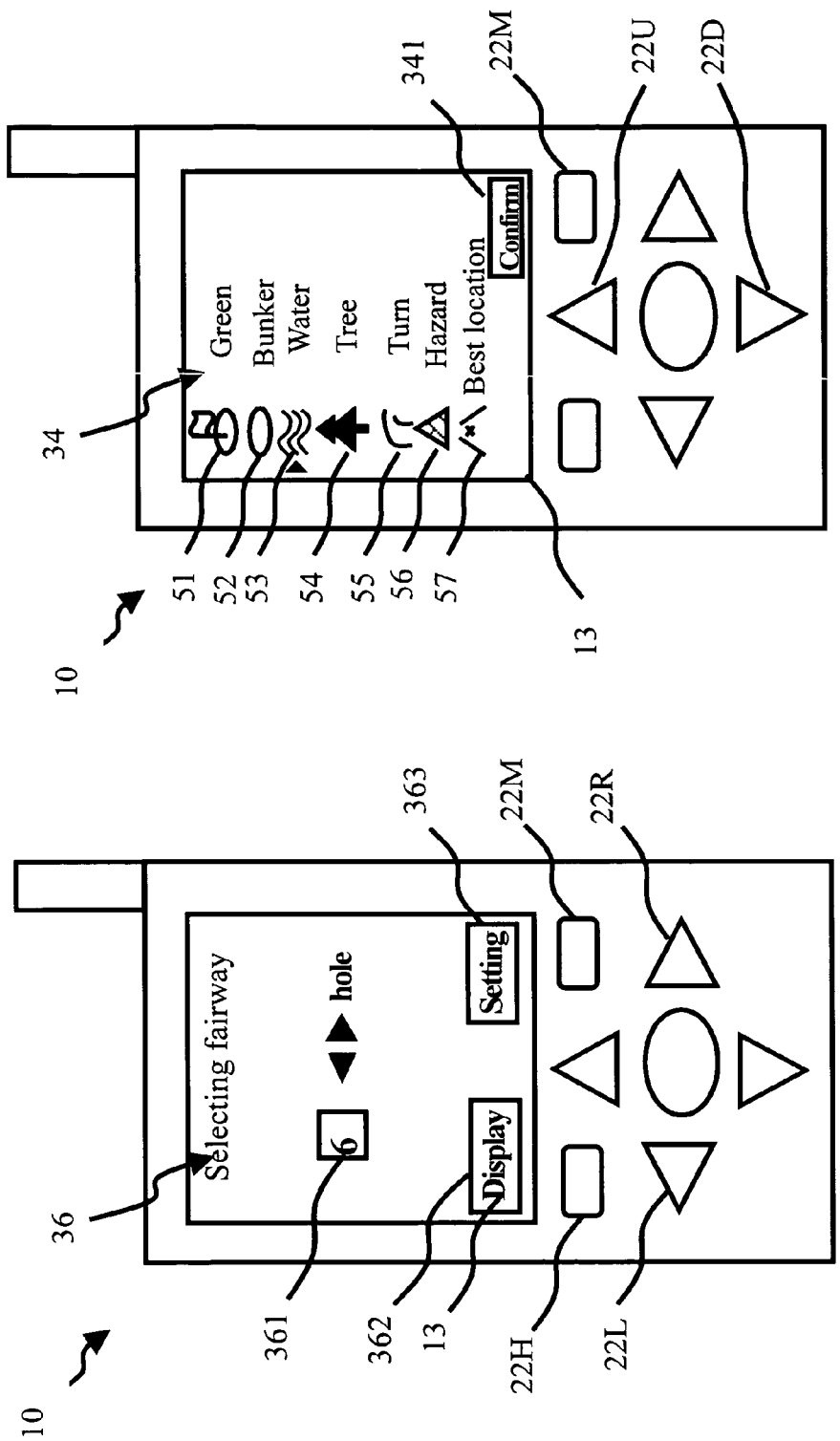

GOLFING AID DEVICE CAPABLE OF DISPLAYING AND SETTING POINTS-OF-INTEREST

BACKGROUND OF THE INVENTION

1. Field of the Invention

The present invention relates to a golfing aid device, and, more particularly, to a golfing aid for recording hazards.

2. Description of the Related Art

Currently, there are many golfing assistant portable devices, and many of them include a GPS module that enable a user to obtain a positional fix in real time.

There are two main types of golfing assistant portable devices having GPS modules.

The first type displays the entire golf course so that the user is provided both a current position and relative distances. However, it is very expensive to collect maps for each golf course.

The second type provides textual information about the golf course, such as SkyCaddie™, which can display the current position of the user and a distance between a hazard and the user; for example, the screen may display the following text:

"374 CENTER"

"226 BkrRt"

"208 Bkr"

These three lines of text respectively indicate that a distance between the user and a green center point is 374 yards, a distance between the user and a right bunker point (BkrRt) is 226 yards, and a distance between the user and a bunker point (Bkr) is 208 yards. A user must therefore memorize the abbreviations for different hazards, which may be a source of inconvenience for the user.

SUMMARY OF THE INVENTION

A main objective of the present invention is to provide a golfing aid device which is able to let a user set the positions of specific points-of-interest, such as bunkers and cups, and which also displays the points-of-interest in a user-friendly manner so that the user can obtain the point-of-interest information, particularly the directions of the points-of-interest.

In order to achieve the above-mentioned objectives, the present invention provides a golf aid device that includes a processor, a screen, an input mechanism, a memory, a GPS module and a software program stored in the memory. The software program includes a points-of-interest setting interface and a points-of-interest displaying interface. A characteristic of the points-of-interest setting interface is that the specific points are shown symbolically. A characteristic of the points-of-interest displaying interface is that left-side, central and right-side displaying areas are provided. When a point-of-interest has a left-side/right-side attribute, it will be displayed in the left-side/right-side displaying area. On the other hand, a point-of-interest that does not have the left-side/right-side attribute is displayed in the central displaying area. Therefore, the user can easily read the information presented in the points-of-interest displaying interface.

Other objects, advantages, and novel features of the invention will become more apparent from the following detailed description when taken in conjunction with the accompanying drawings.

BRIEF DESCRIPTION OF THE DRAWINGS

FIG. 4 is a schematic drawing of an embodiment of a fairway choosing interface according to the present invention.

FIG. 5 is a schematic drawing of an embodiment of a points-of-interest setting interface according to the present invention.

DETAILED DESCRIPTION OF THE PREFERRED EMBODIMENT

Figure 1:
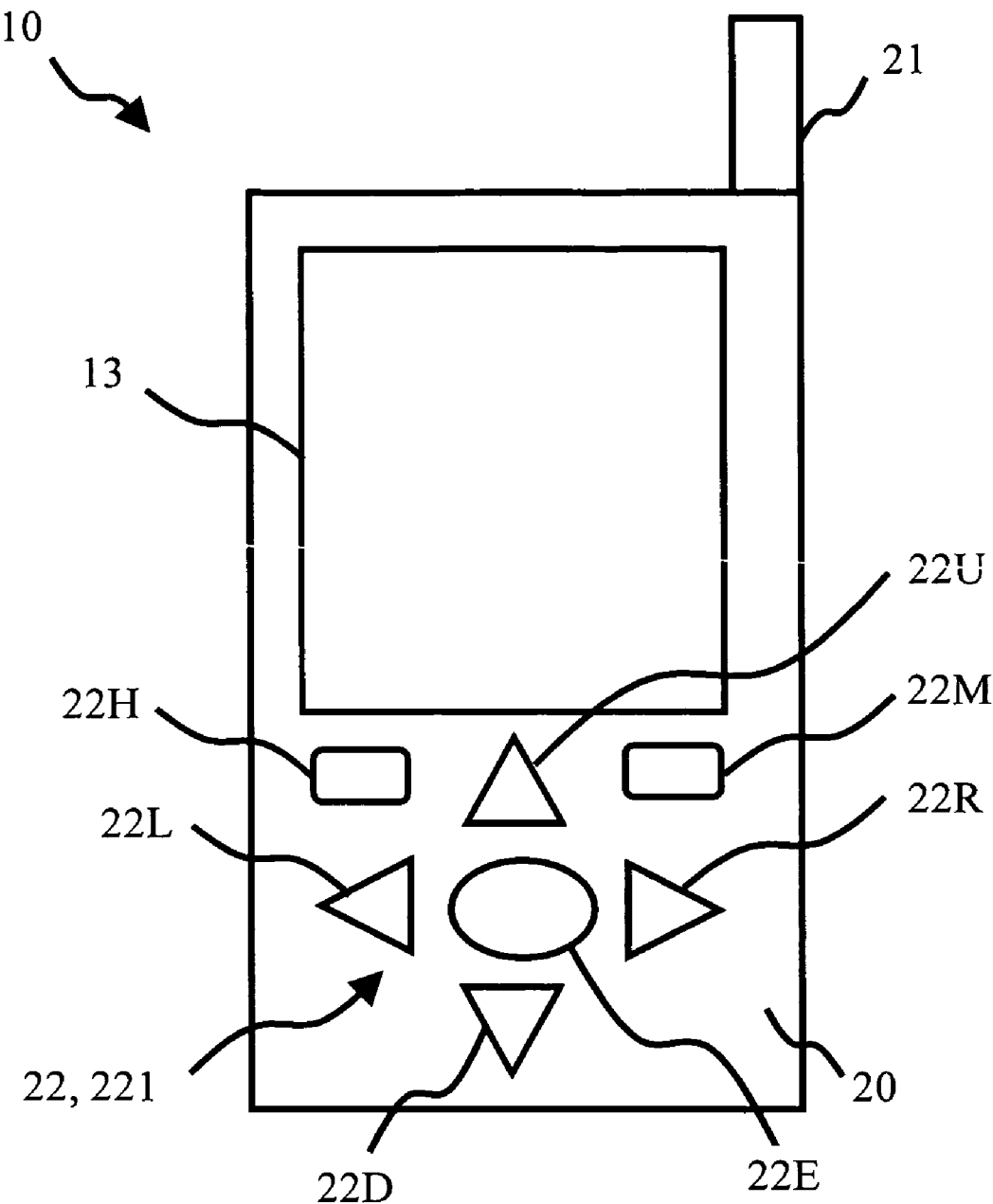
FIG. 1 is illustrates the present invention.

Please refer to FIG. 1. FIG. 1 illustrates the present invention. A golfing aid device 10 capable of displaying and setting points-of-interest comprises a housing 20, a screen 13 disposed in the housing 12, an antenna 21 and an input mechanism 22. In this embodiment, the input mechanism 22 are a plurality of interface buttons 221; FIG. 1 shows an up key 22U, a down key 22D, a left key 22D, a right key 22R, a function key 22M, a hot key 22H and a confirm key 22E.

Figure 2:
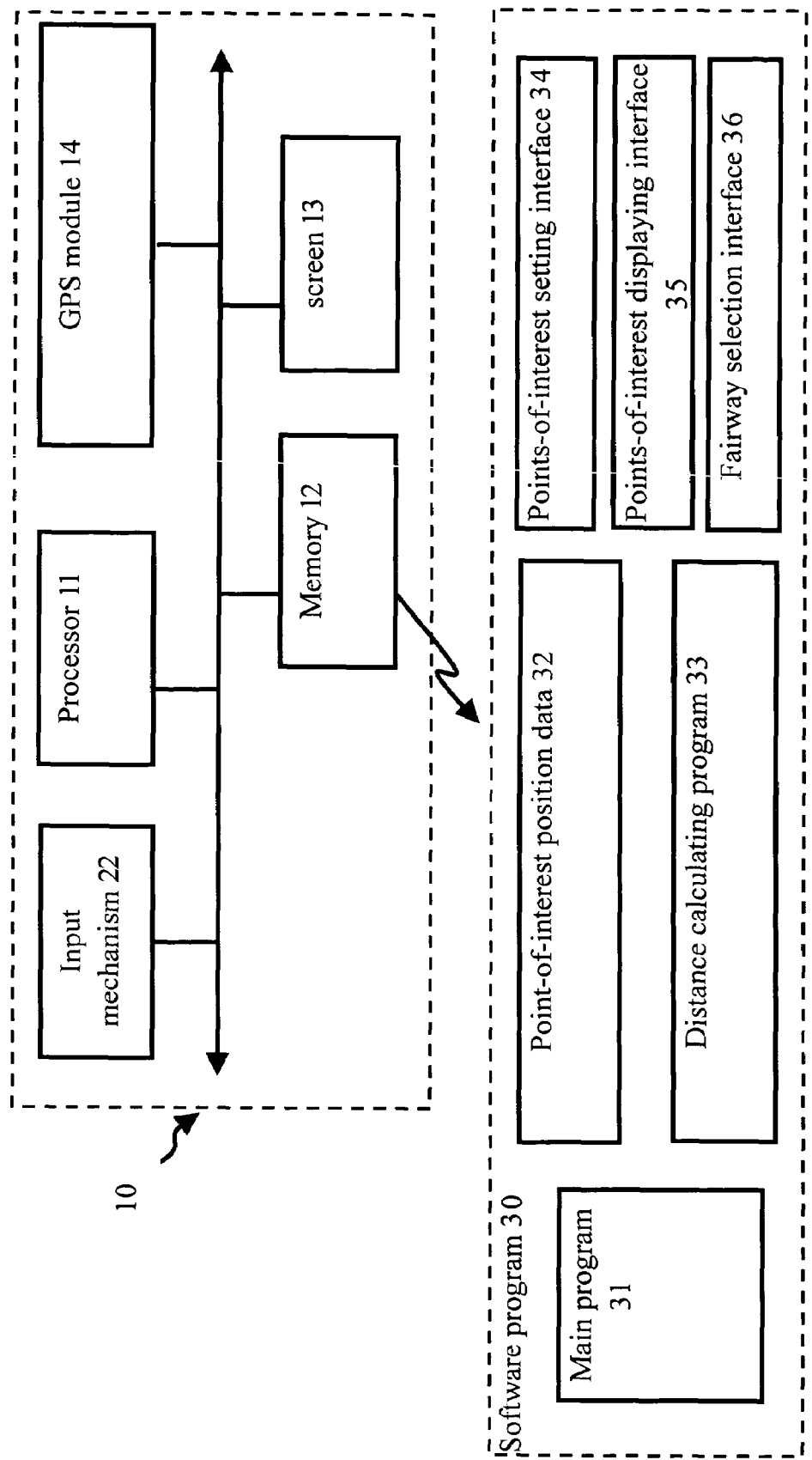
FIG. 2 is a system structure drawing of the present invention.

FIG. 2 is a system structure drawing of the present invention. The present invention comprises a processor 11 and a memory 12, a screen 13, a GPS module 14 and an input mechanism 22, which are all electrically connected to the processor 11. The above-mentioned hardware provides basic components, and the GPS module 14 is used for receiving a plurality of satellite signals to obtain a current position fix for the golfing aid device 10. Since the GPS module 14 is a well known technology, it requires no for further description.

The memory 12 stores a software program 30, and the processor 11 is able to execute the software program 30 to provide the various functionalities of the device, including the displaying of information on the screen 13. The software program 30 of the present invention comprises a main program 31, point-of-interest position data 32, a distance calculating program 33, a points-of-interest setting interface 34, a points-of-interest displaying interface 35 and fairway selection interface 36.

Figure 3:
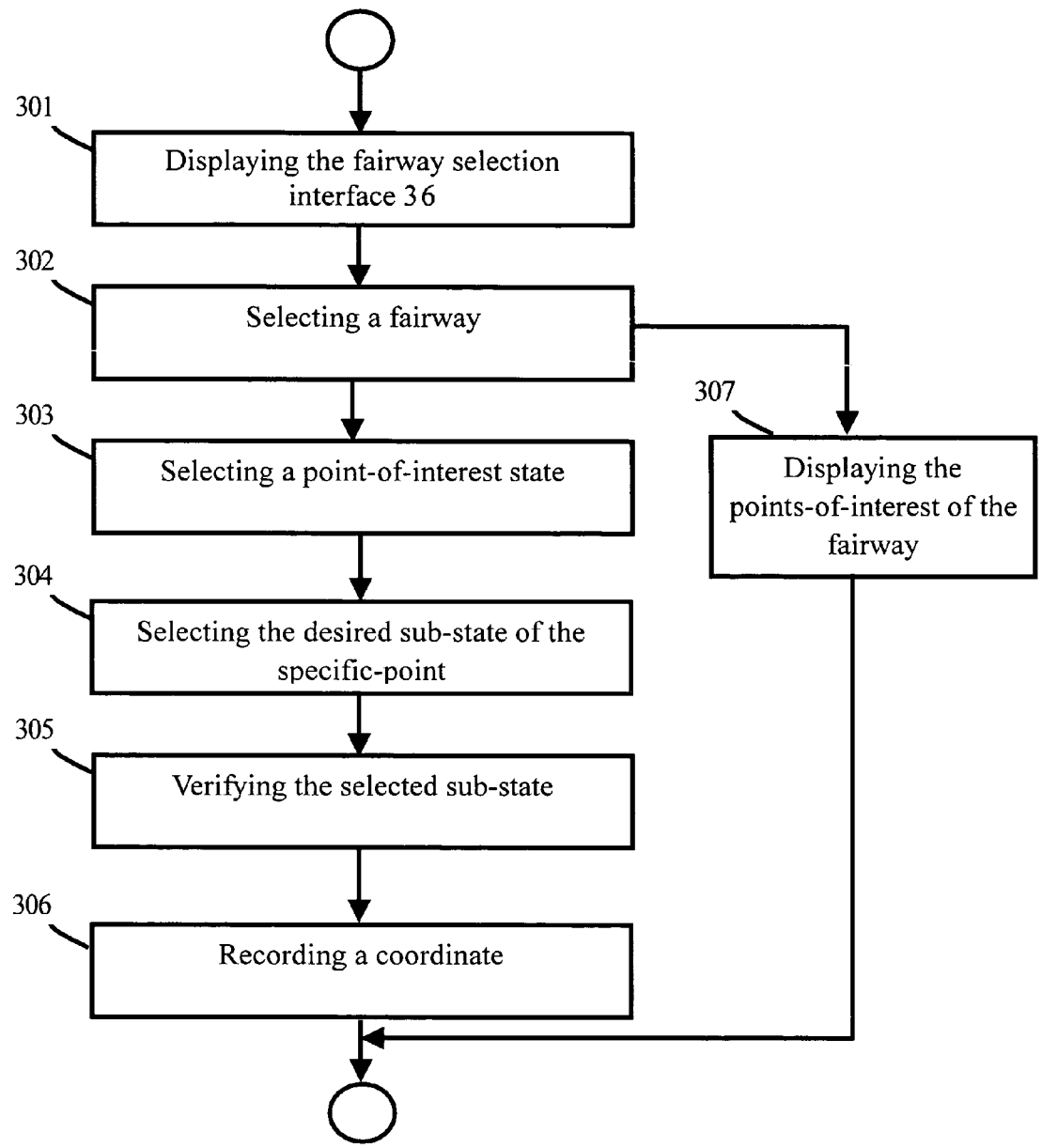
FIG. 3 is a flowchart of the present invention.

Please refer to FIG. 3 for a description of "point-of-interest" and the software program 30. FIG. 3 is a flowchart of the present invention. Additionally, please also refer to FIG. 4~FIG. 11 for embodiments of the interfaces.

Step 301:

Displaying the fairway selection interface 36; please also refer to FIG. 4.

When a user wants to set a point-of-interest for a fairway, or to view predetermined points-of-interest for a fairway, he or she can utilize the fairway selection interface 36. The fairway selection interface 36 can be arranged as a menu (not shown); however, the various types of other interfaces or menus are not relevant characteristics of the present invention, and so are provided no further description.

For this embodiment, the user can click the hot key 22H to enter into the fairway selection interface 36.

Step 302:

Selecting a fairway; please refer to FIG. 4.

The user can use the left key 22D or the right key 22R to choose a fairway, and the selected fairway is displayed in the fairway displaying area 361.

There are two hints below the fairway selection interface 36; the left one is a displaying hint 362, and the right one is a setting hint 363. The user may click the function key 22M to set points-of-interest to enter step 303. The user may click the hot key 22H to display points-of-interest to enter step 307.

Step 303:

Selecting a point-of-interest state in the points-of-interest setting interface 34; please refer to FIG. 5. The point-of-interest in the present invention is used to indicate a specific location. In this embodiment, the points-of-interest include: "green", "bunker", "water", "tree", "turn" "hazard" and "best location". Moreover, the above-mentioned points-of-interest are presented as point-of-interest symbols, so that the user can quickly identify the point-of-interest. The point-of-interest symbols are a green point-of-interest symbol 51, a bunker point-of-interest symbol 52, a water point-of-interest symbol 53, a tree point-of-interest symbol 54, a turn point-of-interest symbol 55, a hazard point-of-interest symbol 56 and a best location point-of-interest symbol 57.

The user can use the up key 22U and the down key 22D to select a desired point-of-interest; for example, as shown in FIG. 5, the water point-of-interest symbol 53 (marked with arrows, or in another alternative manner) is selected. The points-of-interest setting interface 34 has a confirm hint 341 button along its lower right side. The user may click the function key 22M to set the sub-state of the point-of-interest to enter step 304.

Step 304:

Selecting the desired sub-state of the specific-point; please refer to FIGS. 6~12.

In this embodiment, points-of-interest can be further divided into the points-of-interest with different states; therefore, the points-of-interest setting interface 34 may have a further level for the points-of-interest setting interface, which are respectively shown in FIGS. 6~12.

Figure 6:
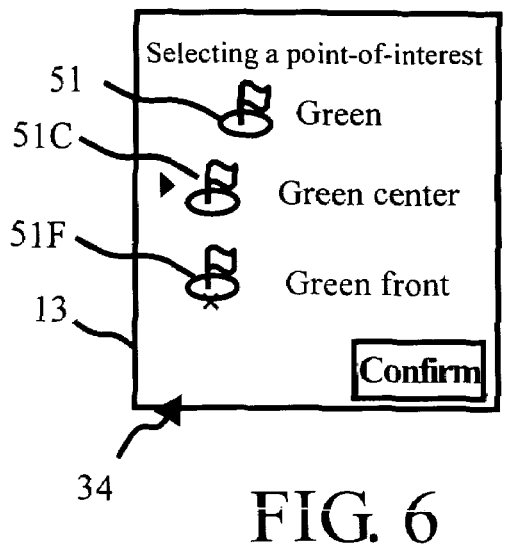
FIG. 6~12 are schematic drawings of embodiments of the points-of-interest setting interface.

FIG. 6 shows the green point-of-interest further comprises a green center symbol 51C indicating the position of a cup, and a green front-end symbol 51F indicating the position of front-end of the green.

Figure 7:
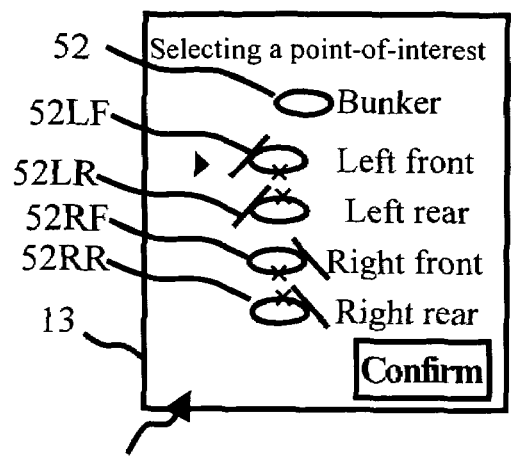

FIG. 7 shows four bunker points-of-interest, which are left front, left rear, right front and right rear bunker points-of-interest and respectively having point-of-interest symbols: 52LF, 52LR, 52RF and 52RR.

Figure 8:
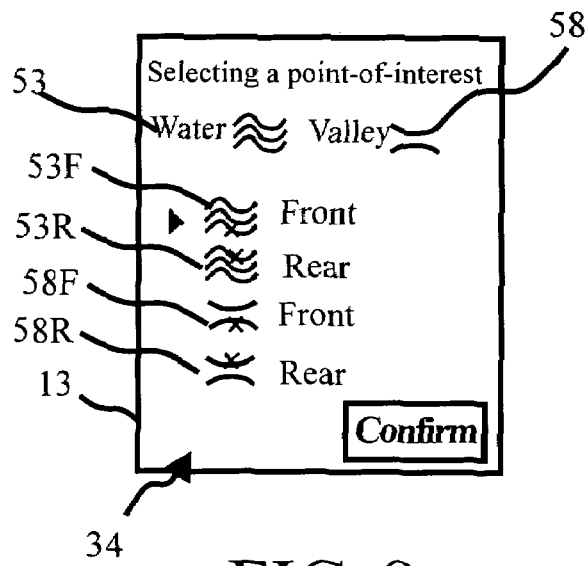

FIG. 8 shows a water point-of-interest (which are usually streams or ponds) and a valley point-of-interest. Although, the valley point-of-interest symbol 58 is not shown in FIG. 5, it is similar to the water point-of-interest, and so they are arranged together. The water point-of-interest and the valley point-of-interest both have a front point and a rear point, therefore, their point-of-interest symbols are respectively 53F, 53R, 58F, 58R.

Figure 9:
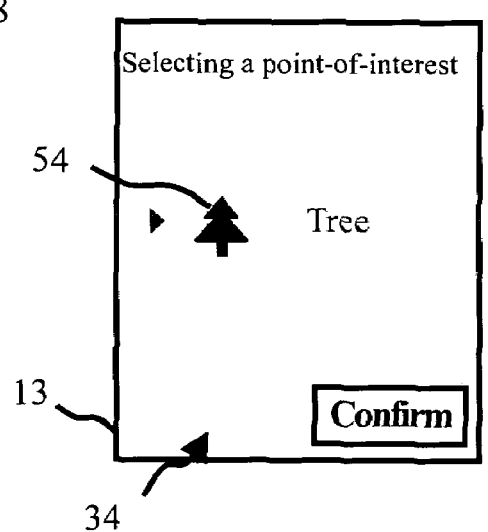

FIG. 9 shows a tree point-of-interest symbol 54; since the tree position needs no direction indication, there is no further tree point-of-interest position, and this interface is not necessary.

Figure 10:
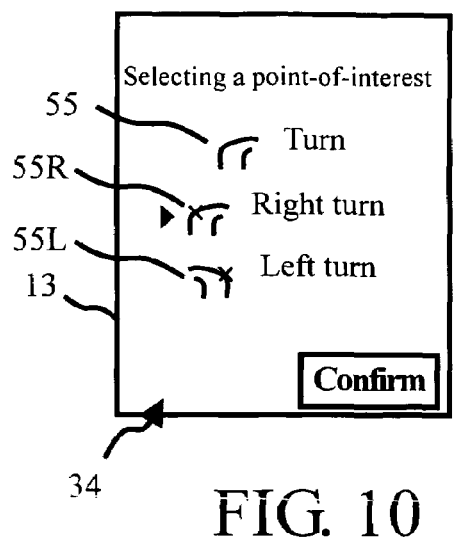

FIG. 10 shows a right turn point-of-interest symbol 55R and a left turn specific-point symbol 55L.

Figure 11:
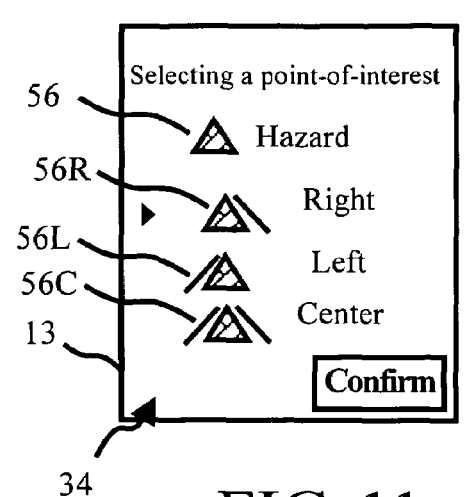

FIG. 11 shows three positions of the hazard point-of-interest, which are a right side position, a left side position and a center position, and their symbols are respectively 56R, 56L, 56C.

Figure 12:
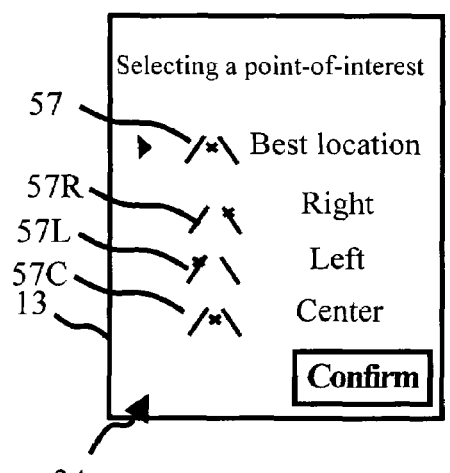

FIG. 12 shows three positions of the best location point-of-interest, which are a right side position, a left side position and a center position, and their symbols are respectively 57R, 57L, 57C.

The above point-of-interest positions are divided into different directions, which include: right side, left side, center, front end and rear end.

Step 305:

Verifying the selected sub-state; please refer to FIG. 7.

For example, when the user walks to one bunker on the sixth fairway, the user may want to record the position of the bunker right rear point. The user can use the up key 22U and the down key 22D to select the bunker right rear point-of-interest symbol 52RR.

Step 306:

Recording a coordinate.

For example, when the user walks to the position of the bunker right rear point on the sixth fairway, since the GPS module 14 can identify the current position of the golfing aid device 10, the golfing aid device 10 can record the coordinate of this position.

Figure 13:
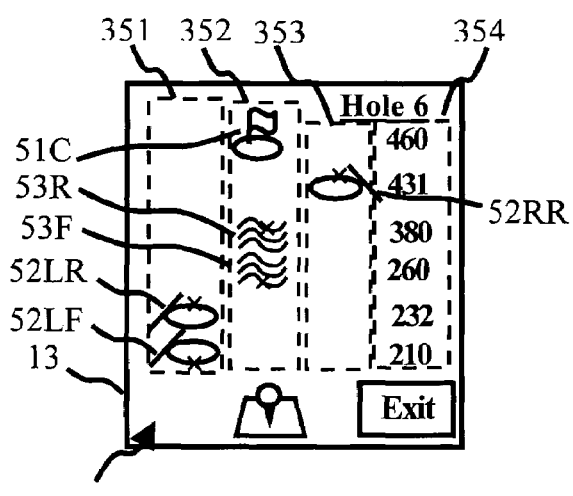
FIG. 13 is a schematic drawing of an embodiment of a points-of-interest displaying interface according to the present invention.

Step 307:

Displaying the points-of-interest of the fairway; please also refer to FIG. 13.

In step 302, the user clicks the hot key 22H to enter into step 307. Taking the sixth fairway as an example, the points-of-interest displaying interface 35 shown in FIG. 13 displays the predetermined points-of-interest on the sixth fairway. The points-of-interest displaying interface 35 comprises three displaying areas arranged in parallel: a left-side displaying area 351, a central displaying area 352, and a right-side displaying area 353. For the points-of-interest shown in FIG. 6~12, the ones with left and right direction identifications are displayed in the corresponding left-side and right-side displaying areas 351, 353, and those without left and right direction identifications are displayed in the central displaying area 352. For example, in FIG. 13, left front and left rear bunker points-of-interest 52LF, 52LR are displayed in the left-side displaying area 351; right rear bunker point-of-interest 52RR is displayed in the right-side displaying area 353; and the front water point-of-interest 53F, the rear water point-of-interest 53R, and the green center symbol 51C are displayed in the central displaying area 352. Since the points-of-interest displaying interface 35 has the left side, center and right-side displaying areas 351, 352, 353, the user can easily understand it.

Moreover, the distance between each point-of-interest and the user is displayed in the displaying area 354. Since the GPS module 14 can immediately obtain the current position of the golfing aid device 10, the distance calculating program 33 can calculate the distance between each point-of-interest and the user, and all points-of-interest are arranged according to their respective distances. Of course, the distance between each point-of-interest and the user can also be displayed below or around the point-of-interest; however, in order to space for the screen 13, the distance displaying area 354 may be arranged in parallel with the other displaying areas.

Although the present invention has been explained in relation to its preferred embodiment, it is to be understood that many other possible modifications and variations can be made without departing from the spirit and scope of the invention as hereinafter claimed. For example, the input mechanism 22 may also be a touch screen instead of the interface buttons 221.

What is claimed is:

1. A golfing aid device configured for displaying and setting points-of-interest comprising:
a processor;
a screen electrically connected to the processor;
an input mechanism electrically connected to the processor;
a GPS module electrically connected to the processor for obtaining a current position for the golfing aid device; and
a memory electrically connected to the processor, wherein the memory stores a software program comprising:
a points-of-interest setting interface, the points-of-interest setting interface displaying a plurality of different point-of-interest symbols for a user, the plurality of different point-of-interest symbols corresponding respectively to the points-of-interest, the plurality of different point-of-interest symbols including a bunker point-of-interest, the points-of-interest setting interface being configured to record a coordinate of the points-of-interest; and
a points-of-interest displaying interface, the points-of-interest displaying interface having a left-side displaying area, a central displaying area, a right-side displaying area and a distance displaying area, wherein the plurality of different point-of-interest symbols are displayed in at least one of the left-side displaying area, the central displaying area and the right-side displaying area according to a respective distance from the points-of-interest to the golfing aid device, and the respective distances are displayed in the distance displaying area.

2. The golfing aid device as claimed in claim 1, wherein the plurality of points-of-interest further comprises a green points-of-interest.

3. The golfing aid device as claimed in claim 2, wherein the green point-of-interest is divided into a green center point-of-interest and a green front-end point-of-interest.

4. The golfing aid device as claimed in claim 2, wherein when the green point-of-interest is displayed, a green point-of-interest symbol is displayed in the central displaying area.

5. The golfing aid device as claimed in claim 1, wherein the plurality of points-of-interest further comprises a turn points-of-interest.

6. The golfing aid device as claimed in claim 1, wherein the plurality of points-of-interest further comprises a best location points-of-interest.

7. The golfing aid device as claimed in claim 1, wherein the plurality of points-of-interest further comprises a water points-of-interest.

8. The golfing aid device as claimed in claim 1, wherein the plurality of points-of-interest further comprises a tree points-of-interest.

9. The golfing aid device as claimed in claim 1, wherein the bunker point-of-interest is divided into a left bunker point-of-interest and a right bunker point-of-interest.

10. The golfing aid device as claimed in claim 9, wherein the left bunker point-of-interest is further divided into a left front bunker point-of-interest and a left rear bunker point-of-interest, and the right bunker point-of-interest is further divided into a right front bunker point-of-interest and a right rear bunker point-of-interest.

11. The golfing aid device as claimed in claim 9, wherein when the left bunker point-of-interest is displayed, a left bunker point-of-interest symbol is displayed in the left-side displaying area, and when the right bunker point-of-interest is displayed, a right bunker point-of-interest symbol is displayed in the right-side displaying area.

12. The golfing aid device as claimed in claim 1, wherein the input mechanism further comprises a hot key, and when a user clicks the hot key, the screen displays the points-of-interest setting interface.

13. The golfing aid device as claimed in claim 1, wherein the software program further comprises a fairway selection interface for inputting a desired fairway.

14. The golfing aid device as claimed in claim 1, wherein the left-side displaying area, the central displaying area, and the right-side displaying area are arranged in parallel.

15. The golfing aid device as claimed in claim 14, wherein each point-of-interest is arranged in sequence according to the distance between each point-of-interest and the golfing aid device.

16. The golfing aid device as claimed in claim 1, wherein the left-side displaying area, the central displaying area, the right-side displaying area, and the distance displaying area are arranged in parallel.

17. The golfing aid device as claimed in claim 16, wherein each point-of-interest is arranged in sequence according to the distance between each point-of-interest and the golfing aid device.

* * * * *